United States Patent [19]

Shaw

[11] Patent Number: 4,946,805
[45] Date of Patent: Aug. 7, 1990

[54] SETTABLE SYSTEMS FOR THE MANUFACTURE OF REFRACTORIES AND CERAMICS

[76] Inventor: Richard D. Shaw, "Dunedin", High Elms Road,, Downe, Orpington, Kent, England

[21] Appl. No.: 214,599

[22] Filed: Jul. 1, 1988

[30] Foreign Application Priority Data

Jul. 3, 1987 [GB] United Kingdom ............ 8715679

[51] Int. Cl.$^5$ .............................................. C03C 3/00
[52] U.S. Cl. ..................................... 501/12; 501/106; 501/128; 501/103
[58] Field of Search .................. 501/12, 133, 128, 106

[56] References Cited

U.S. PATENT DOCUMENTS 4,789,389 12/1988 Schermerhorn et al. ............. 501/12

FOREIGN PATENT DOCUMENTS 2154919 8/1972 Fed. Rep. of Germany .
2258900 6/1974 Fed. Rep. of Germany .
3410628 3/1984 Fed. Rep. of Germany .
1246689 9/1971 United Kingdom .

OTHER PUBLICATIONS

Prep. of Glasses & Ceramics from Metal-Orbank Cmpds. B. E Yoldas Journ of Mate Science 12(1977) 1203–1208.
The Chemistry of Alkyl Silicate Binders in Refractroy Technology; H. G. Emblem Zirconal Processes Ltd.; K. Jones; U.M.I.S.T.; 1038 Transactions & Journal of Brit. Cer. Sty.; vol. 79 (1980) N.

Primary Examiner—William R. Dixon, Jr.
Assistant Examiner—Chris Gallo
Attorney, Agent, or Firm—Cushman, Darby & Cushman

[57] ABSTRACT

A settable liquid system for refractories comprises a gelable alkoxide such as ethyl silicate, water to hydrolyze the alkoxide and a mutual solvent for the alkoxide water and any catalyst. The system further includes a solvent for the alkoxide only.

7 Claims, No Drawings

SETTABLE SYSTEMS FOR THE MANUFACTURE OF REFRACTORIES AND CERAMICS

This invention relates to settable systems for the manufacture of refractories and ceramics. Settable systems based on liquid alkoxides which on hydrolysis set or gel solid are widely used in these manufacturing processes. Examples of these alkoxides are silicon alkoxides (alkyl silicates) and aluminium alkoxide. A refractory aggregate may be mixed with the alkoxide so that a slurry can be set or gelled to a required shape, termed a "green" shape. This green shape is usually fired to a hard refractory body. Moulds, furnace components and other refractories are made by this technique. In certain circumstances the green shape on its own is useful. The art contemplates many uses of such systems.

One typical system is based on ethyl silicate liquid. In order to bring water-insoluble ethyl silicate and water together for hydrolysis a mutual solvent is required. Similar considerations apply to other alkoxides such as aluminium alkoxide. Moreover an accelerator/catalyst is usually required for the hydrolysis and setting reactions, such a catalyst either being basic or acidic. The art relating to refractories and ceramics thus lays importance on the use of a mutual solvent for all parts of the setting system, organic or inorganic, and such mutual solvents are typically alcohols compatible with ethyl silicate, the water for hydrolysis and the accelerator/catalyst.

The present invention has found, surprisingly, that the introduction into the system of a solvent which is a non-mutual solvent offers substantial benefits particularly in a base-catalyzed hydrolysis. A non-mutual solvent is defined in this specification as a solvent for the organic ethyl silicate but not for water.

Thus according to a first aspect the present invention provides a liquid settable system comprising the alkoxide, water, and a mutual solvent for the alkoxide and the water characterized by the presence of a non-mutual solvent as set out above.

In accordance with another aspect of the invention a method of making refractory shapes comprises the step of mixing a refractory aggregate into a slurry with the alkoxide and hydrolysing the alkoxide in the presence of a suitable catalyst in order to set the slurry in the presence of a non-mutual solvent as set out above.

Examples of suitable non-mutual organic solvents are oils, hydrocarbon or vegetable based, paraffins petroleum, and white spirit, toluene, xylene. The required property is the capacity to dissolve the alkoxide while being immiscrible with water. The solvent should be otherwise substantially inert to the system as a whole. The invention has principal applicability to systems in which a basic catalyst typified by amines such as piperidine, morpholine, triethylamine, dicyclohexylamine or ethanolamine or alkalies such as those of Na, K, NH or complex 4 derivatives is used. However, the invention is in principle applicable to systems catalysed with an acid such as hydrochloric acid and this has been experimentally demonstrated.

The invention will now be further described with reference to the following Examples.

EXAMPLES OF ETHYL SILICATE BASED SETTABLE SYSTEMS

Example I

| | |
|---|---|
| Ethyl Silicate 40 (a commercially available partially hydrolyzed and polymerized product containing 40% $SiO_2$) | 800 ccs |
| White Spirit (a petroleum distillate used as a turpentine substitute; turpentine itself may be used) | 200 ccs |
| IPA (Isopropyl alcohol) | 250 ccs |
| $H_2O$ for hydrolysis | 40 ccs |
| Piperidine (catalyst/accelerator) | 15 ccs |

The above ingredients are mixed and allowed to gel; the gelling time is of the order of 15 minutes.

Example II

| | |
|---|---|
| Ethyl Silicate 40 | 800 ccs |
| White Spirit | 800 ccs |
| IPA | 250 ccs |
| $H_2O$ | 80 ccs |
| Piperidine | 20 ccs |

Gel time of 10 minutes after mixing.

Example III

| | |
|---|---|
| Ethyl Silicate 40 | 800 ccs |
| White Spirit | 1200 ccs |
| IPA | 250 ccs |
| $H_2O$ | 80 ccs |
| Piperidine | 20 ccs |

Gel time approximately 10 minutes after mixing.

Example IV

| | |
|---|---|
| Ethyl Silicate 40 | 900 ccs |
| White Spirit | 1200 ccs |
| IPA | 1200 ccs |
| $H_2O$ | 180 ccs |
| Piperidine | 52 ccs |

Gel time approximately 6 minutes after mixing depending upon temperature.

It was experimentally verified that the above examples work well with Diesel oil 32 sc viscosity, paraffin oil (kerosene) 28 sc viscosity, toluene light lubricating oil 20/40 grade and petrol. Thus a wide range of non-mutual solvents have been demonstrated as effective.

The examples work with methanol or ethanol as the mutual solvent instead of isopropyl alcohol. Example No. IV may be seen to have an excess of water to ethyl silicate and the silica in the solution on weight volume or weight basis is less than 10%. Typically in ceramics and refractories without the non-mutual solvent this figure would have to be at least 18% and typically 25%–30%. The advantage of the present invention is thus apparent.

Unhydrolyzed tetraethylorthosilicate can be used successfully in place of ethyl silicate 40.

It is generally recognized that as the concentration of ethyl silicate in the solution drops the amount of catalyst required to obtain adequate gel and gel time increases. Typically a solution containing 30% $SiO_2$ would require 1% piperidine catalyst addition to ethyl silicate to obtain an appropriate gel time of say 15 minutes but in a solution containing 10% $SiO_2$, 3% or more catalyst would be required.

It has been found that the amount of catalyst used is surprisingly reduced back to 1% with the presence of a solvent for the ethyl silicate but not for the water.

Thus the Example III system has less than 10% SiO and less than 1% catalyst but still gels effectively.

It has been found in practice that the volume of non-mutual solvent that can be added requires to be in the order of 10% of the volume of ethyl silicate 40 or pure ethyl silicate 28% $SiO_2$ (TEOS) to have a desirable effect. However, as can be seen in the above examples, the addition can exceed the volume of ethyl silicate in the total volume. There does appear for the solvents experimented with to be a practical upper limit to the addition in the order of 1.5 volumes non-mutual solvent to 1 volume ethyl silicate. The balance of the dilution is done by a conventional mutual solvent.

It has also been found that when using low concentrations of ethyl silicate in systems according to the invention the water contents may be increased to an extent that there is a substantial surplus of water to that required for hydrolysis.

In a dilute solution it has been found that twice the amount of water necessary for hydrolysis may be added to the solution without detriment which not only assists rate of gelation, but also the rate of gel hardening. This is particularly relevant in dilute solutions when it is well recognized that the hardening time of the gel can and does become very protracted.

A further property of the non-mutual solvent is to simplify mould stripping thus allowing the handling of pieces of lower green strengths, that is strength in the set but unfired states. This property is particularly marked when a saturated mutual solvent such as a paraffin is used. On hydrolysis of ethyl silicate, ethyl alcohol is liberated. Saturated hydrocarbons and lower alcohols have limited mutual solubility and this effect seems to enhance mould stripping and may reduce the formation of bubbles by the development of a surface film.

The following refractory aggregates are examples of those that can be incorporated in systems according to the invention:

| | |
|---|---|
| Molochite | Sillimanite |
| Mullite | Alumina |
| Zircon | Basic Magnesite |
| Zircon Mullite | Silicon Carbide |
| Fused silica | |

Some further aspects of the invention will now be described by way of the following further Examples.

Example V Manufacture of a Refractory Shape 11 kg of granular mullite are mixed with 860 cc of bonding liquid made up of 458 cc of ethyl silicate (40) and 229 cc of white spirit, a non-mutual solvent. Thus there are 78 cc of bonding liquid per kg of refractory aggregate. The slurry thus produced is moulded or otherwise formed to a desired shape and gelled by the addition of an accelerator made up of 131 cc isopropyl alcohol, 35 cc of $H_2O$ and 7 cc of piperidine making a 173 cc total. The water in the accelerator provides water for hydrolysis.

It should be noted that in the absence of the non-mutual solvent at least 85 cc of bonding liquid per kilogram of refractory grain would be required. The water to ethyl silicate ratio would be 7.6% and thus the solution would only be 48% hydrolyzed. The presence of the paraffin has reduced the amount of total liquid present by 8% and not increased the requirement for piperidine consumption.

It should be noted that the the preferred addition procedure of liquid constituents is to take the ethyl silicate and non-mutual solvent as a first constituent and adding as a second the water, catalyst and mutual solvent.

Example VI Manufacture of a Refractory Brick 11 kg of tabular alumina are mixed with 240 cc of ethylsilicate 40 and 160 cc of a non-mutual solvent paraffin oil. To the mixture was also added a hydrolyzing and catalyzing solution comprising 220 cc of isopropyl alcohol (mutual solvent), 40cc water and 7.4 cc of piperidine. The 40 cc of water represents 16.6% of ethylsilicate which means that the solution will fully hydrolyze. The piperidine represents 1.12% of the total volume of liquid. This mixture is placed in a mould, set and dried and fired into a refractory body containing 99.28% alumina.

The total content of liquid to aggregate is 60 cc per kilogramme. Normally with ethylsilicate bonding and in the absence a non-mutual solvent 70 cc per kilogram of liquid would be necessary. This represents a saving of bonding liquid of 10cc per kilogram.

Example VII Manufacture of Silica Free Alumina Body 21 kg of refractory tubular alumina are mixed with 550 cc of alumina alkoxide A300 supplied by Chemplex Limited which is a 10% alumina compound and 330 cc of a proprietary accelerator A5 (a mixture of isopropanol, acetic acid and water). The alumina alkoxide A300 is supplied in a white spirit. constituting the non-mutual solvent for the system. After thorough mixing this system can be cast in a mould by vibration and sets into a green shape in approximately 10 minutes. On moulding and firing a pure alumina body is obtained.

Example VIII Acid Catalyzed System

| | |
|---|---|
| Ethyl silicate 40 | 1876 ccs |
| White Spirit | 1250 ccs |
| IPA | 1166 ccs |
| $H_2O$ | 268 ccs |
| Hydrochloric Acid | 5.6 ccs |

The ingredients were mixed and agitated in order to hydrolyze. An acid sol is formed. Separation of this non-mutual solvent takes place with time but it is relatively easy to redisperse.

The solution will have a stability of several days.

Example IX

| | |
|---|---|
| Ethyl Silicate 40 | 1200 ccs |
| Silica Sol 10/30 | 400 ccs |
| $H_2O$ | 400 ccs |
| Hydrochloric Acid | 35 ccs |
| White Spirit | 400 ccs |

A stable solution of some 48 hours is obtained after mixing and agitating. This solution has a substantial excess of water and separates on standing.

Each of the above examples can be caused to gel by upsetting (reducing) the pH by the addition of $NH_4CO_3$ or ammonium acetate or fine ground magnesite.

I claim:

1. A liquid settable system comprising an alkoxide which on hydrolysis sets to a solid gel, water and a mutual solvent for the alkoxide and water characterized by the addition of at least 10% by volume of the alkoxide of a non-mutual water immiscible solvent which dissolves the alkoxide and not the water, such addition acting to reduce the required amount of alkoxide and/or catalyst.

2. A system according to claim 1 wherein the alkoxide is an alkyl silicate.

3. A system according to claim 1 including an alkaline catalyst.

4. A settable system according to claim 1 in the form of a slurry including refractory aggregates.

5. A method of making a refractory shape which comprises the steps of mixing a refractory aggregate into a slurry with an alkoxide which on hydrolysis sets to a solid gel, hydrolyzing the alkoxide to set the slurry to the required shape in the presence of at least 10% by volume of the alkoxide of a non-mutual water immiscible solvent for the alkoxide and firing the shape.

6. A method according to claim 5 wherein the alkoxide is an alkyl silicate.

7. A system according to claim 4 wherein the alkaline catalyst is piperidine.

* * * * *